United States Patent [19]
Aahlad et al.

[11] Patent Number: 5,969,967
[45] Date of Patent: *Oct. 19, 1999

[54] METHODS AND APPARATUS FOR CONSPIRACY BETWEEN OBJECTS

[75] Inventors: Yeturu Aahlad; Jefferson A. Dinkins, both of Sunnyvale, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/001,765

[22] Filed: Dec. 31, 1997

Related U.S. Application Data

[63] Continuation of application No. 08/414,778, Mar. 31, 1995, abandoned.

[51] Int. Cl.$^6$ ................................................. G05B 15/00
[52] U.S. Cl. ......................... 364/131; 364/134; 370/254; 709/221; 709/223
[58] Field of Search ..................................... 364/131, 132, 364/133, 134, 140.01, 140.02, 140.03, 140.04, 148.02, 148.03, 148.04, 148.05; 370/254; 395/700, 600, 650, 200.1, 200.11, 200.12, 200.15, 200.73; 709/221, 223, 227, 237

[56] References Cited

U.S. PATENT DOCUMENTS

| | | | |
|---|---|---|---|
| 4,005,391 | 1/1977 | McPherson | 340/172.5 |
| 4,352,097 | 9/1982 | Hamann | 340/571 |
| 4,977,595 | 12/1990 | Ohta et al. | 380/24 |
| 5,095,480 | 3/1992 | Fenner | 370/94.1 |
| 5,224,098 | 6/1993 | Bird et al. | 370/94.1 |
| 5,224,162 | 6/1993 | Okamoto et al. | 380/24 |
| 5,251,205 | 10/1993 | Callon et al. | 370/60 |
| 5,251,258 | 10/1993 | Tanaka | 380/21 |
| 5,278,901 | 1/1994 | Shieh et al. | 370/4 |
| 5,307,490 | 4/1994 | Davidson et al. | 395/650 |
| 5,309,516 | 5/1994 | Takaragi et al. | 380/45 |
| 5,339,430 | 8/1994 | Lundin et al. | 395/700 |
| 5,355,492 | 10/1994 | Frankel et al. | 395/700 |
| 5,374,932 | 12/1994 | Wyschologrod et al. | 342/36 |
| 5,377,350 | 12/1994 | Skinner | 395/600 |
| 5,388,264 | 2/1995 | Tobias, II et al. | 395/600 |
| 5,390,138 | 2/1995 | Milne et al. | 381/119 |
| 5,467,856 | 11/1995 | Okada | 194/202 |
| 5,481,715 | 1/1996 | Hamilton et al. | 395/700 |
| 5,481,721 | 1/1996 | Serlet et al. | 395/700 |
| 5,485,369 | 1/1996 | Nicholls et al. | 364/401 |
| 5,509,123 | 4/1996 | Dobbins et al. | 395/200.15 |
| 5,511,002 | 4/1996 | Milne et al. | 364/514 R |
| 5,515,508 | 5/1996 | Pettus et al. | 395/200.01 |
| 5,519,618 | 5/1996 | Kastner et al. | 364/439 |
| 5,539,909 | 7/1996 | Tanaka et al. | 395/700 |
| 5,544,297 | 8/1996 | Milne et al. | 395/154 |
| 5,544,318 | 8/1996 | Schmitz et al. | 395/200.04 |
| 5,546,584 | 8/1996 | Lundin et al. | 395/700 |
| 5,551,035 | 8/1996 | Arnold et al. | 395/650 |

*Primary Examiner*—William Grant
*Assistant Examiner*—Ramesh Patel
*Attorney, Agent, or Firm*—Beyer & Weaver, LLP

[57] ABSTRACT

A number of methods and apparatus are disclosed for providing a service in a distributed object operating environment. According to some embodiments of the present invention, methods and apparatus for providing a conspiracy among objects in a object operating environment are disclosed. In particular, conspiracies within a distributed object operating environment are contemplated. In general, the present invention teaches mechanisms by which a collection of objects can form a conspiracy wherein objects can both communicate behind the object interfaces and share all resources. In some embodiments, the collection of objects work together to provide a service to clients. According to one embodiment, the objects which are members of the conspiracy may be distributed objects located in separate processes. In some embodiments, objects which are members of the conspiracy are able to perform interactions with one another behind the interface (i.e. without having to communicate through the interface) and also share persistent state. Three specific embodiments of the present invention are described, these being (1) a shared servant conspiracy model, (2) a shared object conspiracy model, and (3) a hybrid object conspiracy model. Each of these embodiments incorporates the conspiracy concept of the present invention yet they each have particular advantages which will be apparent upon reading the detailed description of the figures.

22 Claims, 11 Drawing Sheets

METHODS AND APPARATUS FOR CONSPIRACY BETWEEN OBJECTS

This is a Continuation application of prior application Ser. No. 08/414,778 filed on Mar. 31, 1995, now abandoned.

BACKGROUND OF THE INVENTION

The present invention relates to the fields of distributed computing systems, client-server computing and object-oriented programming. More specifically, the present invention teaches methods and apparatus for providing a conspiracy between objects within a distributed object operating environment.

Object oriented programming methodologies have received increasing attention over the past several years in response to the growing tendency for software developed using traditional programming methods to be delivered late and over budget. This stems from the fact that traditional programming techniques that emphasize procedural models and "linear" code tend to be difficult to design and maintain in many circumstances. Generally, large programs created using traditional methods are "brittle". That is, even small changes can effect numerous elements of the programming code. Thus, minor changes made to the software in response to user demands can require major redesign and rewriting of the entire program.

Object oriented programming strategies tend to avoid these problems because object methodologies focus on manipulating data rather than procedures; thus providing the programmer with a more intuitive approach to modeling real world problems. In addition objects encapsulate related data and procedures so as to hide that information from the remainder of the program by allowing access to the data and procedures only through the object's interface. Hence changes to the data and or procedures of the object are relatively isolated from the remainder of the program. This provides code that is more easily maintained as compared to code written using traditional methods, as changes to an object's code do not affect the code in the other objects. In addition, the inherent modular nature of objects allows individual objects and interfaces to be reused in different programs. Thus, programmers can develop libraries of "tried and true" objects and interfaces that can be used over and over again in different applications. This increases software reliability while decreasing development time, as reliable programming code may be used repeatedly.

A more recent advance in the field of object oriented methodologies has been the implementation of distributed object operating environments over computers interconnected via a computer network. As used herein, the term "distributed object" or "object" refers to an encapsulated package of code and data that can be manipulated by operations through an interface. Thus, distributed objects will be seen by those skilled in the art of object oriented programming (OOP) as including the basic properties that define traditional programming objects. However, distributed objects differ from traditional programming objects by the inclusion of two important features. First, distributed objects are multilingual. That is, the interfaces of distributed objects are defined using an interface definition language that can be mapped to a variety of different programming languages. One such interface definition language is Object Management Group's IDL. Second, distributed objects are location-independent, i.e., distributed objects can be located anywhere in a network. This contrasts sharply with traditional programming objects which typically exist in a single address space.

Elaborating further on the distributed object operating environment, distributed objects can be object clients or object servers, depending upon whether they are sending requests to other objects or replying to requests from clients. In a distributed object operating environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service.

When a client calls a target object, certain procedures must be performed to ensure that the target object can perform the requested service. These procedures include identifying and locating the target object, starting the server process (if necessary) under which the target object resides, activating the target object (if necessary), and, finally, establishing a connection with the target object and passing the call. The ORB together with an Object Adapter (OA) is responsible for working with the client and the target object to perform these services.

One prior art model for providing a service will be discussed now with reference to FIG. 1. In explanation, a service 50 is a computer entity which provides a service to a client such as client 52. Typically in the prior art, the service 50 is resident within a single computer process, often called the "server process" or just the "server." The service 50 includes objects (standard objects or distributed objects) such as object_1 54, object_2 56, and object_3 56. These objects work together to provide the service 50. Each of object_1 54, object_2 56, and object_3 58 will, respectively, have an interface such as interface_1 60, an interface_2 62, and an interface_3 64. As discussed previously, access to the data and procedures of the object are allowed only through the object interface and are therefore limited by the nature of the interface. This insures modularity of the objects.

While the prior art model of FIG. 1 allows multiple objects to work together in providing the service 50 to the client 52, there are limitations inherent to this model due to the modular nature of objects and the constraints presented by the interfaces. For example, in many scenarios the object interfaces will be written to hide and protect the internal object data and procedures from the client 52. However, for the server 50 to operate best (if at all), it may be necessary for the objects to conspire with each other. For example, the objects may require communication with each other which lies outside the capabilities of their respective interfaces. Perhaps object_1 54 needs to know a value of state contained in object_3 58, but it is desirable to protect and/or hide this value from the client 52. Thus the interface_3 wouldn't provide for object_1 54 to access this value and the service 50 would be unable to fulfill its function. What is needed are methods and apparatus for providing a conspiracy between objects. The conspiracy will enable interaction between objects which occurs "behind" the interface. For example, the conspiracy will allow the conspirator objects to share persistent state.

SUMMARY OF THE INVENTION

To achieve the foregoing and other objectives and in accordance with the purpose of the present invention, methods and apparatus for providing a conspiracy between objects are taught. According to one embodiment of the present invention, a computer implemented service includes a conspiracy servant and a multiplicity of conspirator objects. The computer implemented service is intended to reside within a server process which executes on a computer that is arranged to be a part of a distributed object environment. Each conspirator object has an associated object reference and an associated skeleton. Each skeleton is arranged to receive requests from clients that reside outside of the server process and pass incoming client requests directly to the conspiracy servant. Furthermore, the conspiracy servant is arranged to provide the requested services that are requested of each of the conspirator objects.

In a related embodiment, the computer implemented service further includes a servant lookup table that is accessible to the skeletons and is intended to reside in the process. The servant lookup table serves to identify the location of all active servants available for use in the process, including the conspiracy servant. In some embodiments, each of the distributed objects each have a distinct interface. In another related embodiment, the conspiracy servant of the computer implemented service is arranged to return results directly to the client. In yet another related embodiment, the skeletons of the computer implemented service are arranged to unmarshal client requests received from remote clients. Thus the skeletons can take a distributed object call and convert the distributed call into a call suitable for the conspiracy servant.

According to a separate embodiment of the present invention, another computer implemented service arranged to be a part of a distributed object environment based computing system is disclosed. In this embodiment, the computer implemented service includes a conspiracy object and a plurality of distributed conspirator objects. The conspiracy object has a conspiracy skeleton and a conspiracy servant as well as an associated conspiracy object reference that is unknown to and hidden from external clients. In turn, each of the distributed objects have an associated conspirator object reference that may be known by external clients, an associated conspirator skeleton that is arranged to receive requests from clients, and an associated conspirator servant. The conspirator skeleton is arranged to pass incoming client requests directly to the conspiracy servant, the conspiracy servant knowing the object reference associated with the conspiracy object so that the conspirator servant can make requests to the conspiracy object.

In a related embodiment, the computer implemented service further has a servant lookup table that is available to the skeletons and identifies the location of various servants, including the conspiracy servant. In another related embodiment, each of the conspirator objects of the computer implemented service have a distinct interface. In yet another related embodiment, the conspiracy servants may perform operations in response to the client request both prior to and after passing the request along to the conspiracy object.

In another separate embodiment of the present invention, a computer implemented service arranged to reside within a server process executed on a computer that is arranged to be a part of a distributed object environment based computing system is disclosed. The computer implemented service includes a conspiracy object and a plurality of distributed objects. The conspiracy object includes a conspiracy skeleton, a conspiracy servant, and a conspiracy engine. Furthermore, the conspiracy object further has an associated conspiracy object reference that permits access to the conspiracy skeleton and that is not known to external clients. Each distributed conspirator object has an associated conspirator skeleton that is arranged to receive requests from clients, an associated conspirator object reference that permits access to the conspiracy skeleton and may be known by external clients, and an associated conspirator servant. The conspirator skeleton is able to pass incoming client requests directly to the conspirator servant. In turn, the conspirator servant knows the object reference associated with the conspiracy object and therefore can make requests to the conspiracy object. Furthermore, the conspiracy servant is arranged to return a direct pointer to the conspiracy engine to the conspirator servants when a request is made to the conspiracy object so that the conspirator servants can communicate directly with the conspiracy engine.

One method aspect of the present invention teaches a computer implemented method for providing a service to clients, the service being implemented within a server process that includes a conspiracy servant and a plurality of conspirator objects each having a conspirator skeleton. The computer implemented method includes the computer controlled steps of receiving at a first conspirator skeleton a first invocation request for a first conspirator object associated with the first conspirator skeleton, causing the first conspirator skeleton to directly invoke the conspiracy servant, returning a result directly from the conspiracy servant to a client that initiated the first conspirator invocation request, receiving at a second conspirator skeleton a second invocation request for a second conspirator object associated with the second conspirator skeleton, the first and second conspirator skeletons being distinct from one another, causing the second conspirator skeleton to directly invoke the conspiracy servant, and returning a result directly from the conspiracy servant to a client that initiated the second conspirator invocation request.

In a related method aspect of the invention, each time one of the conspirator skeletons invokes the conspiracy servant, the invoking skeleton checks an active servant lookup table to determine whether the conspiracy servant is identified as active in the lookup table. Additionally, when it is determined that the conspiracy servant is not identified as active in the lookup table, the invoking skeleton creates the conspiracy servant and identifies the conspiracy servant as active in the lookup table. In some embodiments, a conspiracy ID is used as a key in the lookup table and a pointer to the conspiracy servant is stored as a value that corresponds to the key. In additional embodiments, when the conspiracy servant is identified as active in the lookup table, the invoking skeleton identifies the conspiracy servant using the conspiracy ID and utilizes the stored value that corresponds to the conspiracy ID to locate the conspiracy servant. In another embodiment, each of the conspirator skeletons share a single conspiracy ID that operates as the skeleton's servant ID.

In a separate method aspect, a computer implemented method for providing a service to clients is taught. The service has a conspiracy object having a conspiracy skeleton and a conspiracy servant, a plurality of conspirator objects each having a conspirator skeleton, and a conspirator servant. The method comprises the computer controlled steps of receiving at a first conspirator skeleton a first invocation request for a first conspirator object associated with the first conspirator skeleton, causing the first conspirator skeleton to invoke the first conspirator servant, causing the first conspirator servant to invoke a conspiracy object reference associated with the conspiracy object, the conspiracy object reference not be available to clients that are not part of the service, returning a result from the conspiracy servant to the first conspirator servant that initiated the first conspirator invocation request, receiving at a second conspirator skeleton a second invocation request for a second conspirator object associated with the second conspirator skeleton, causing the second conspirator skeleton to invoke the second conspirator servant, causing the second conspirator servant to invoke the conspiracy object reference associated with the conspiracy object, the conspiracy object reference not available to clients that are not part of the service, returning a result from the conspiracy servant to the second conspirator servant that initiated the second conspirator invocation request, and returning results from the conspirator servants to their respective clients.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE INVENTION

Figure 2:
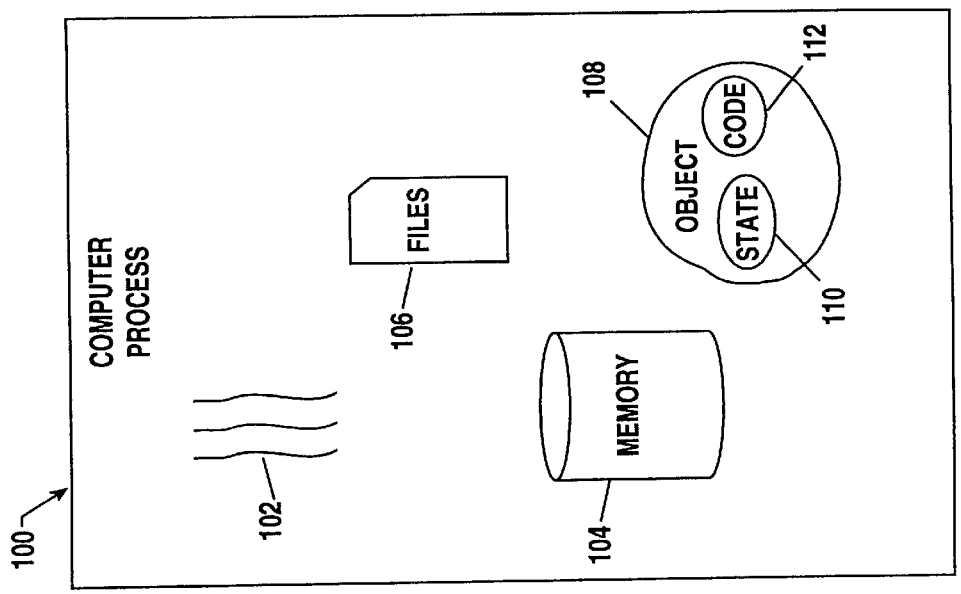
FIG. 2 is a pictorial illustration of a computer process in accordance with one embodiment of the present invention, the computer process having multiple threads of execution, distributed objects, file identifiers, and memory.
Figure 1:
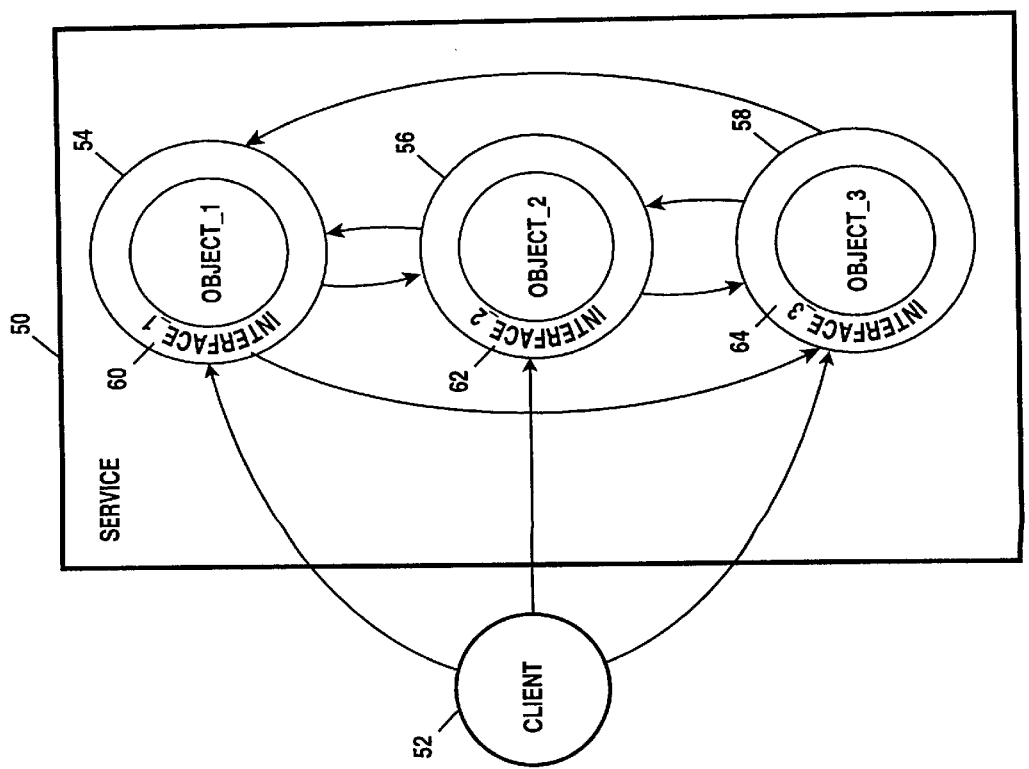
FIG. 1 is a diagrammatic illustration of a client-service interaction of the prior art, the service including three objects which can be accessed only through their interfaces.

The present invention relates to an object operating environment based on object oriented programming (OOP). More specifically, this invention discloses methods and apparatus for providing conspiracy among objects. Following the Definition of Terms, the methods and apparatus will be discussed in more detail, first through discussing example computer systems which are suitable for the present invention, next continuing with a detailed description of several embodiments of the apparatus and data structures of the present invention, and then further through the detailed description of the method aspects of the present invention.

I. Definition of Terms

As used herein, the term "distributed object" or "object" refers to an encapsulated package of code and data that can be manipulated by operations through a defined interface that is associated with an object. Thus, distributed objects will be seen by those skilled in the art as including the basic properties that define traditional programming objects. However, distributed objects differ from traditional programming objects by the inclusion of two important features. First, distributed objects are multilingual. The interfaces of distributed objects are defined using an interface definition language that can be mapped to a variety of different programming languages. One such interface definition language is OMG's IDL. Second, distributed objects are location-independent, i.e., distributed objects can be located anywhere in a network. This contrasts sharply with traditional programming objects which typically exist in the same address space as the client. Distributed objects can be object clients or object servers, depending upon whether they are sending requests to other objects or replying to requests from other objects. Requests and replies are made through an Object Request Broker (ORB) that is aware of the locations and status of the objects.

A "distributed object system" or "distributed object operating environment" refers to a system comprising distributed objects that communicate through an ORB.

An "object reference" or "objref" is an object that contains a direction or an indirection to another object. The creation and definition of object references will be familiar to those skilled in the art.

A "client" as defined herein refers to an entity that sends a request to second object. In this model, the second object is referred to as a "server object" or a "target object". Thus, clients invoke operations, or implementations, from servers. In a distributed object environment, clients need not have knowledge of the implementation programming language, nor does the implementation have to have knowledge of the client's programming language due to the requirement of multilingual character of such objects. Clients and servers in distributed object environments need only communicate in terms of the interface definition language. As noted above, the request by the client to the server, and the server's reply to the client, is handled by the ORB. It should be pointed out that the client and server can exist within the same process, on the same host computer, or on two different host computers.

An "object interface" is a specification of the operations, attributes, and exceptions that an object provides. Preferably, object interfaces for distributed objects are written using an IDL. As noted above, objects perform transactions through their interfaces. The use of interfaces therefore relieves the need of objects that are aware of the programming languages used to define the methods and data of the objects in the transaction.

A "conspiracy: between objects is a computer implemented mechanism enabling interaction between objects which occurs "behind" the objects' interfaces, the underlying purpose of the conspiracy being to aid in providing a computer implemented service to clients. For example, a conspiracy may allow conspirator objects, i.e., objects which are members of the conspiracy, to share persistent state which is not intended to be accessible through the objects' interfaces.

A "conspirator object" is an object involved in a computer implemented mechanism enabling interaction between objects which occurs "behind" the objects' interfaces. In other words, a conspirator object is an object that is a member of a conspiracy.

A "conspiracy skeleton" is the skeleton corresponding to a conspirator object. As will be appreciated by those skilled in the art, a "skeleton" is generated for each interface within a programming language. The skeleton is the structure which invokes the methods implemented as part of the conspirator object implementation. The developer of the object implementation must fill the skeleton with actual code that will be invoked when a request is received.

A "conspiracy servant" is the servant corresponding to a particular conspiracy, the conspiracy servant operable to perform services requested of a conspirator object which is a member of the partivular conspiracy.

II. Providing a Conspiracy

According to the present invention, a variety of methods and apparatus for providing a conspiracy among objects in a object operating environment are disclosed. In particular, conspiracies within a distributed object operating environment are contemplated. In general, the present invention teaches mechanisms by which a collection of objects can form a conspiracy wherein objects can both communicate behind the object interfaces and share all resources. In some embodiments, the collection of objects work together to provide a service to clients. According to one embodiment, the objects which are members of the conspiracy may be distributed objects located in separate processes. In some embodiments, objects which are members of the conspiracy are able to perform interactions with one another behind the interface (i.e. without having to communicate through the interface) and also share persistent state. Three specific embodiments of the present invention are described, these being (1) a shared servant conspiracy model, (2) a shared object conspiracy model, and (3) a hybrid object conspiracy model. Each of these embodiments incorporates the conspiracy concept of the present invention yet they each have particular advantages which will be apparent from the detailed descriptions of the figures.

By way of background, objects can be object clients or object servers, depending upon whether they are sending requests to other objects or replying to requests from clients. Furthermore, a collection of objects may work together to provide a "service" to clients. In a distributed object environment, requests and replies are made through an Object Request Broker (ORB) that is aware of the locations and status of the objects. One architecture which is suitable for implementing such an ORB is provided by the Common Object Request Broker Architecture (CORBA) specification. The CORBA specification was developed by the Object Management Group (OMG) to define the distributed computing environment world in terms of objects in a distributed client-server environment, where server objects are capable of providing services to clients requesting the service.

In the following discussion, the terms "object" and "distributed object" will be used interchangeably. Nevertheless, those skilled in the art will be able to differentiate among the different kinds of objects and the different usage's of the term object from the context or by an explicit identifying statement. In general, distributed objects have the quality of being accessible (via the ORB) to clients throughout a distributed object operating environment, whereas traditional programming objects, such as C++ or SmallTalk objects, are only available to clients resident in the same memory space as the traditional programming object.

In general, a servant object will perform the actual services (i.e. the operations) requested by clients. However, in a distributed object operating environment the distributed object must have additional entities which perform the steps necessary to enable the object to perform services for clients located throughout the distributed object operating environment. For example, a client located in a remote computer process will invoke an operation of the distributed object by calling a surrogate object resident within the remote computer process. The surrogate object in turn performs the functions necessary to transmit the call to the distributed object. Functions performed by the surrogate include marshaling the call in preparation for transmittal and then transmitting the call. In turn, the server process under which the servant object is resident will also include a corresponding skeleton object which performs functions such as receiving an operation invocation for the distributed object, unmarshaling the invocation, and invoking the operation of the servant object. Thus an activated distributed object may include a servant object (to perform the object operations), a surrogate object (to marshal and transmit calls), and a skeleton object (to receive and unmarshal calls).

When a client calls an object, it must have addressing information corresponding to the object. In a traditional (i.e. non distributed) object oriented operating environment, clients can only interact with objects which are resident in the same address space, that is, within the same process. Thus the addressing information is typically just a pointer directing to the address space where the target object resides. In a distributed object operating environment, the surrogate object must have an object reference for the desired target object. The object reference essentially contains sufficient addressing information to direct the client to the target object. The object reference addressing information may be direct addressing information. For example, the direct addressing information may include a host computer network address, a server process network port number, and a target object identifier. However, the addressing information may be an indirection or a combination of a direct addressing information and an indirection. In explanation, an "indirection" is a set of information, a pointer, etc., which directs the client entity to a source (such as a locator object) which can direct the client entity to the object. By way of a descriptive analogy, if a client requested geographical directions, an indirection would point the client to the location of a current map, or perhaps provide the client with a phone number of a geographically astute individual.

For a more detailed description of addressing information, as well as suitable embodiments of different kinds of object references, please see Brownell et. al.'s copending U.S. patent application Ser. No. (Attorney Docket No. SUN1P025/P721) entitled "METHODS, APPARATUS, AND DATA STRUCTURES FOR MANAGING OBJECTS", which is incorporated herein by reference in its entirety. Furthermore, one suitable embodiment for establishing and terminating connections between objects in a distributed object operating environment is disclosed in Brownell et. al.'s copending U.S. patent application Ser. No.

(Attorney Docket No. SUN1P08/P715) entitled "METHOD AND APPARATUS FOR MANAGING CONNECTIONS FOR COMMUNICATION AMONG OBJECTS IN A DISTRIBUTED OBJECT SYSTEM" which is incorporated herein by reference.

When a client calls a target object in a distributed object operating environment, certain procedures must be performed to ensure that the target object can perform the requested service(s). These procedures include identifying and locating the target object, starting the server process (if necessary) under which the target object resides, activating the target object if necessary, coordinating the target object's persistent state with its implementation (if necessary), and, finally, establishing a connection with the target object and passing the call. The ORB together with an Object Adapter (OA) is responsible for working with the client and the target object to perform these services. Suitable embodiments for starting the server process, activating the target object, registering the target object with a locator service and other tasks involved with managing server processes are disclosed in Menges et. al.'s copending U.S. patent application Ser. No. (Attorney Docket No. SUN1P030/P747), entitled "METHODS AND APPARATUS FOR MANAGING COMPUTER PROCESSES", which is incorporated herein by reference in its entirety.

Objects, as contemplated by the present invention, are implemented (by the ORB and/or the host computer) under computer processes. Computer processes provide a well known and common framework under which computer systems implement different threads of execution. By way of analogy, a computer process can be thought of as a domain partitioned within a computer system.

In actuality, a process typically includes address space (i.e. a portion of memory allocated to only the process), a set of file descriptors, a process identification number, and one or more threads of execution (often referred to as threads). Multi-threaded systems, such as contemplated by the present invention, allow for multiple threads to run concurrently in a single process. For a more detailed description of threads, multi-threaded processes, and principles of concurrency, please see "Concurrency Within DOE Object Implementations" by Dr. Robert Hagmann, Version 0.91, May 27, 1993, published by SunSoft and incorporated herein by reference in its entirety.

FIG. 2 illustrates a multi-threaded process 100 in accordance with one embodiment of the present invention. The process 100 may be implemented on a computer such as computer 30 and includes multiple threads such as thread 102, allocated memory 104 which may include both persistent and transient memory, file identifiers 106, and at least one object such as object 108. The object 108 includes state 110 and code 112. The object 108 is typically defined by the state 110 and the code 112. Code 112 is essentially the operating instructions by which the object executes. State 110 is thus the remaining portion which is not executable code.

Figure 3:
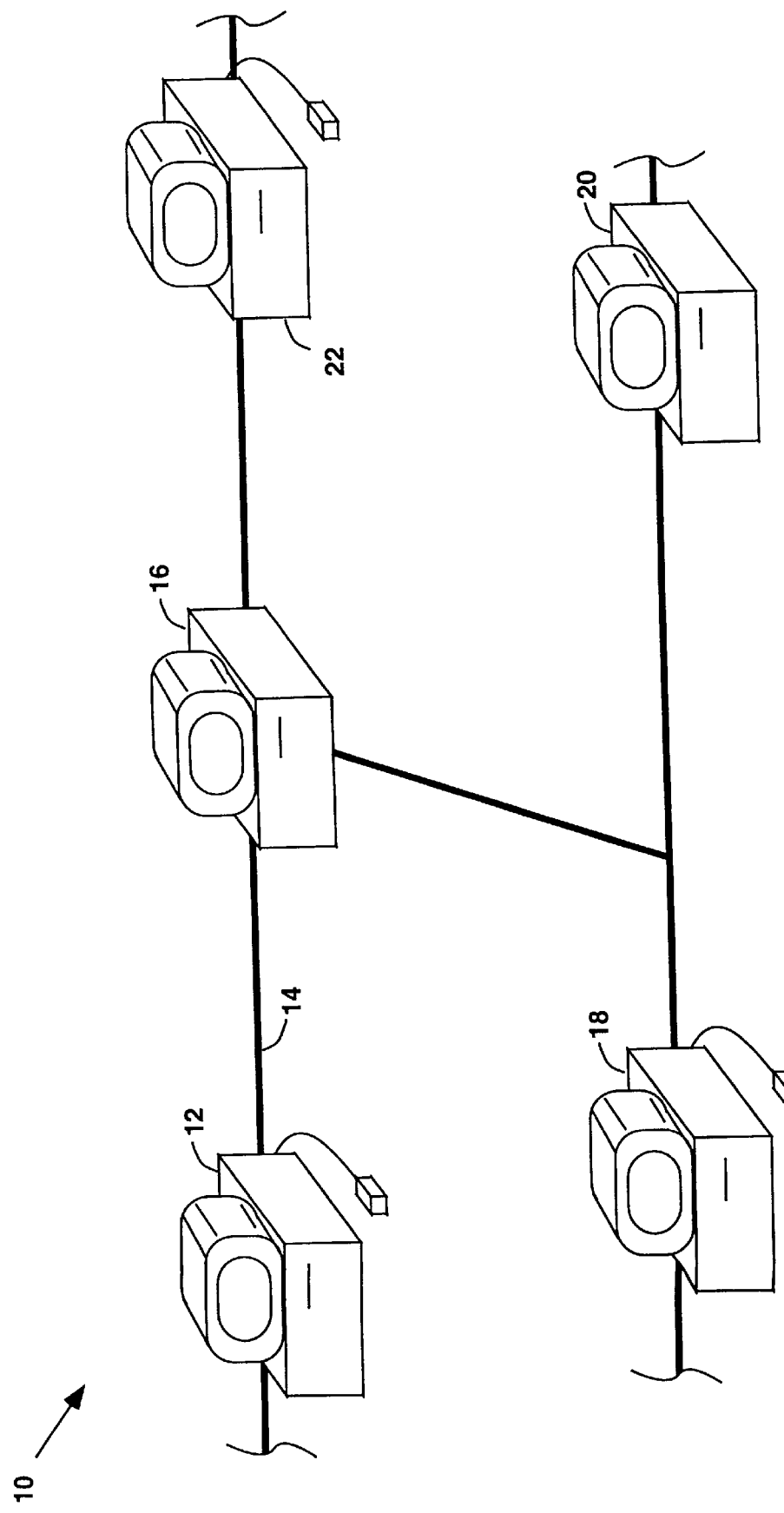
FIG. 3 is a pictorial illustration of various computers linked together in a computer network.

In a specific embodiment of the present invention, computer services, distributed objects, computer processes, and clients of the distributed objects are resident on one or more computers linked together by a network. The network may take any suitable form. By way of example, a representative network arrangement 10 is illustrated in FIG. 3. The network arrangement 10 includes a first computer 12 which is coupled to a transmission line 14. The network 10 further includes a server, router or the like 16 in addition to other computers 18, 20, and 22 such that data and instructions can be passed among the networked computers. The design, construction and implementation of computer networks will be familiar to those of skill in the art.

Figure 4:
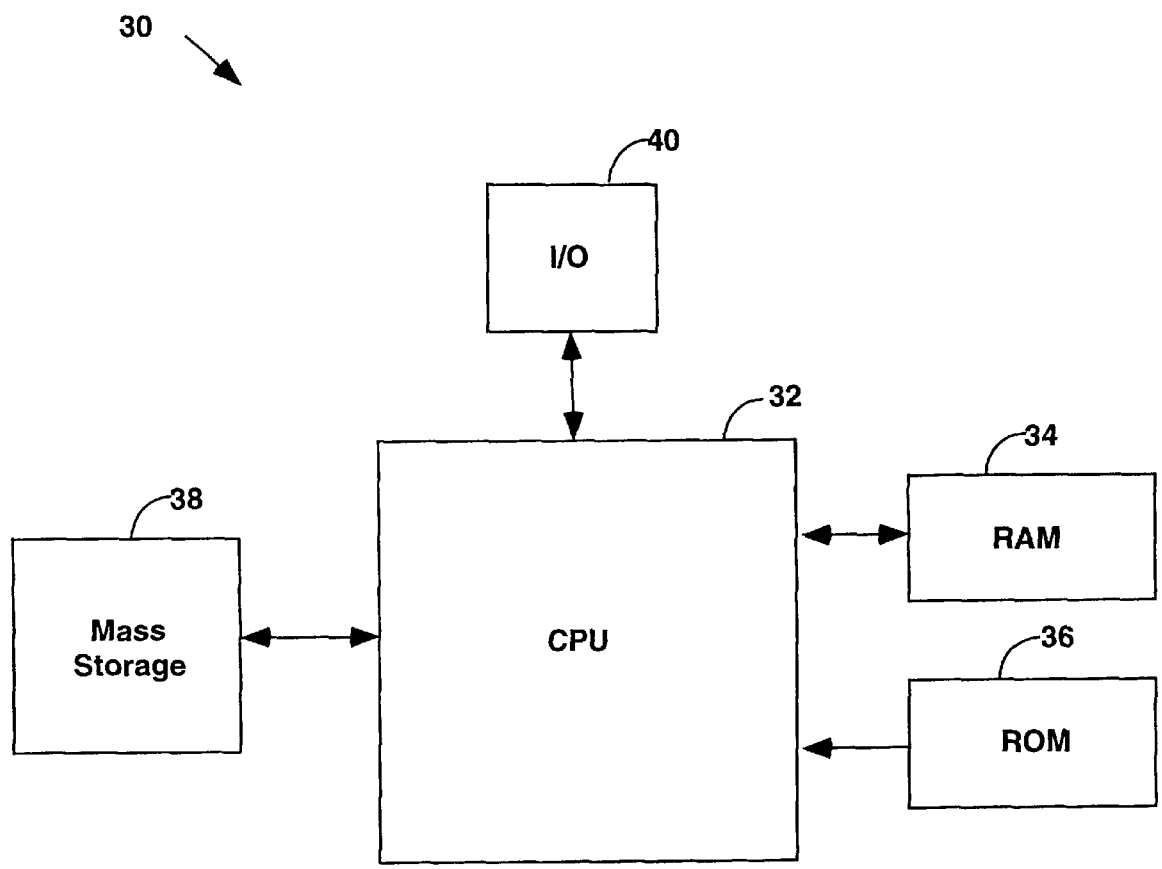
FIG. 4 illustrates diagramatically the major components of a computer in FIG. 3.

A representative computer 30 suitable for use as computers 12, 18, 20, and/or 22 of FIG. 3 is illustrated schematically in FIG. 4. Computer 30 includes a central processing unit (CPU) 32 which is coupled bidirectionally with random access memory (RAM) 34 and unidirectionally with read only memory (ROM) 36. Typically, RAM 34 is used as a "scratch pad" memory and includes programming instructions and data, including distributed objects and their associated code and state, for processes currently operating on CPU 32. ROM 36 typically includes basic operating instructions, data and objects used by the computer to perform its functions. In addition, a mass storage device 38, such as a hard disk, CD ROM, magneto-optical (floptical) drive, tape drive or the like, is coupled bidirectionally with CPU 32. Mass storage device 38 generally includes additional programming instructions, data and objects that typically are not in active use by the CPU, although the address space may be accessed by the CPU, e.g., for virtual memory or the like. Each of the above described computers optionally includes input/output sources 40 that typically include input media such as a keyboard, pointer devices (e.g., a mouse or stylus) and/or network connections. Additional mass storage devices (not shown) may also be connected to CPU 32 through a network connection. It will be appreciated by those skilled in the art that the above described hardware and software elements, as well as networking devices, are of standard design and construction, and will be well familiar to those skilled in the art.

A shared servant model for providing a conspiracy in accordance with one embodiment of the present invention will be described now with reference to FIG. 5. In the shared servant conspiracy model, each of the conspirator objects reside in a common server process and have a pointer which directs to a conspiracy servant object also resident in the server process. When a client calls one of the conspirator objects to invoke an object operation, the conspirator skeleton, having the direct pointer, can pass the invocation from the client directly to the conspiracy servant object. The requested service can then be performed by the conspiracy servant object which in turn can return any results directly to the client (actually, the ORB manages returning the results, the conspiracy servant is unaware of the origin of the call). Note that in this situation the conspirator objects conspire by way of a pointer. Thus in the shared servant conspiracy model, the conspirator objects must all reside in the same process. Additionally, as a result of directly passing the call using the pointer, the identity of the client (as well as the conspirator) is lost to the conspiracy servant. Therefore the shared servant conspiracy paradigm is not useful in situations where the identity of the client is necessary to perform the requested services and the client identity cannot be determined from the parameters present in the call.

Figure 5:
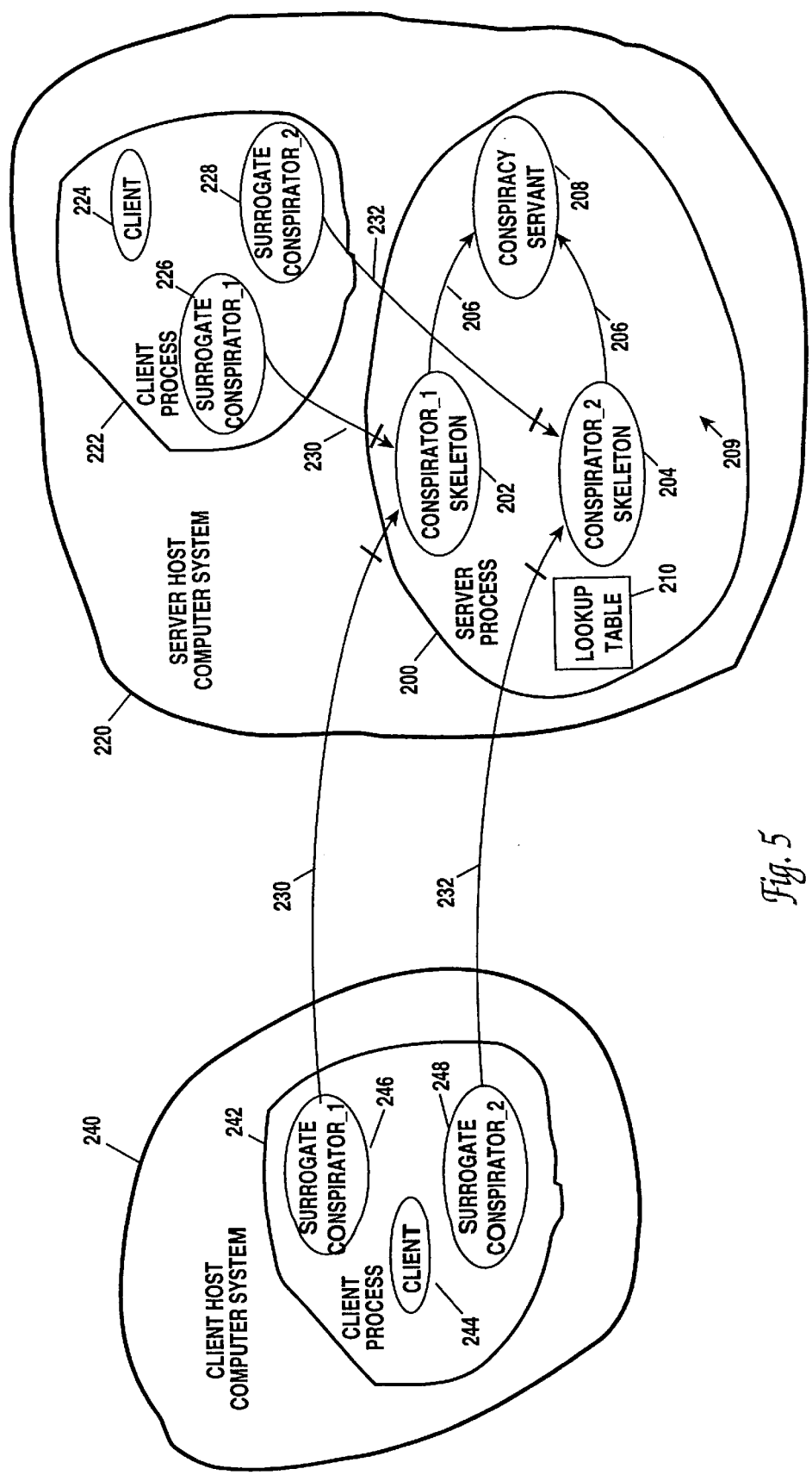
FIG. 5 is a pictorial diagram of a shared servant conspiracy model in accordance with one embodiment of the present invention.

FIG. 5 illustrates one sample scenario of the shared servant model in which a server process 200 provides services to a plurality of clients. The server process 200 includes conspirator objects having skeletons such as conspirator_1 skeleton object 202 and conspirator_2 skeleton object 204. Conspirator_1 skeleton object 202 and conspirator_2 skeleton object 204 each have a conspiracy pointer 206 directing the servant objects to a conspiracy servant object 208. The conspirator_1 skeleton object 202, the conspirator_2 skeleton object 204, and the conspiracy servant object 208 comprise a shared servant conspiracy 209. As will be appreciated by those skilled in the art of object oriented programming, a pointer such as conspiracy pointer 206 points directly to an address in local server process memory. In some embodiments, the server process 220 also includes an active servant lookup table 210 which will be described in more detail later.

Also shown in FIG. 5 is a server host computer system 220 (wherein the server process 200 resides) and a remote client host computer system 240. The server host computer system 220 further includes a local client process 222 having a local client 224, a surrogate conspirator_1 object 226 and a surrogate conspirator_2 object 228. In turn, the surrogate conspirator_1 object 226 has a conspirator_1 object reference 230 and the surrogate conspirator_2 object 228 has a conspirator_2 object reference 232. As will be appreciated by those skilled in the art of object oriented programming, surrogate objects reside in processes separate from the target object host process and act as a local representation of the target object.

The remote client host computer system 240 includes a remote client process 242 having a remote client 244, a remote surrogate conspirator_1 object 246, and a remote surrogate conspirator_2 object 248. In turn, the remote surrogate conspirator object 246 and the remote surrogate conspirator_2 object 248 have conspirator object references conspirator_1 object reference 230 and conpirator_2 object reference 232, respectively.

Figure 6:
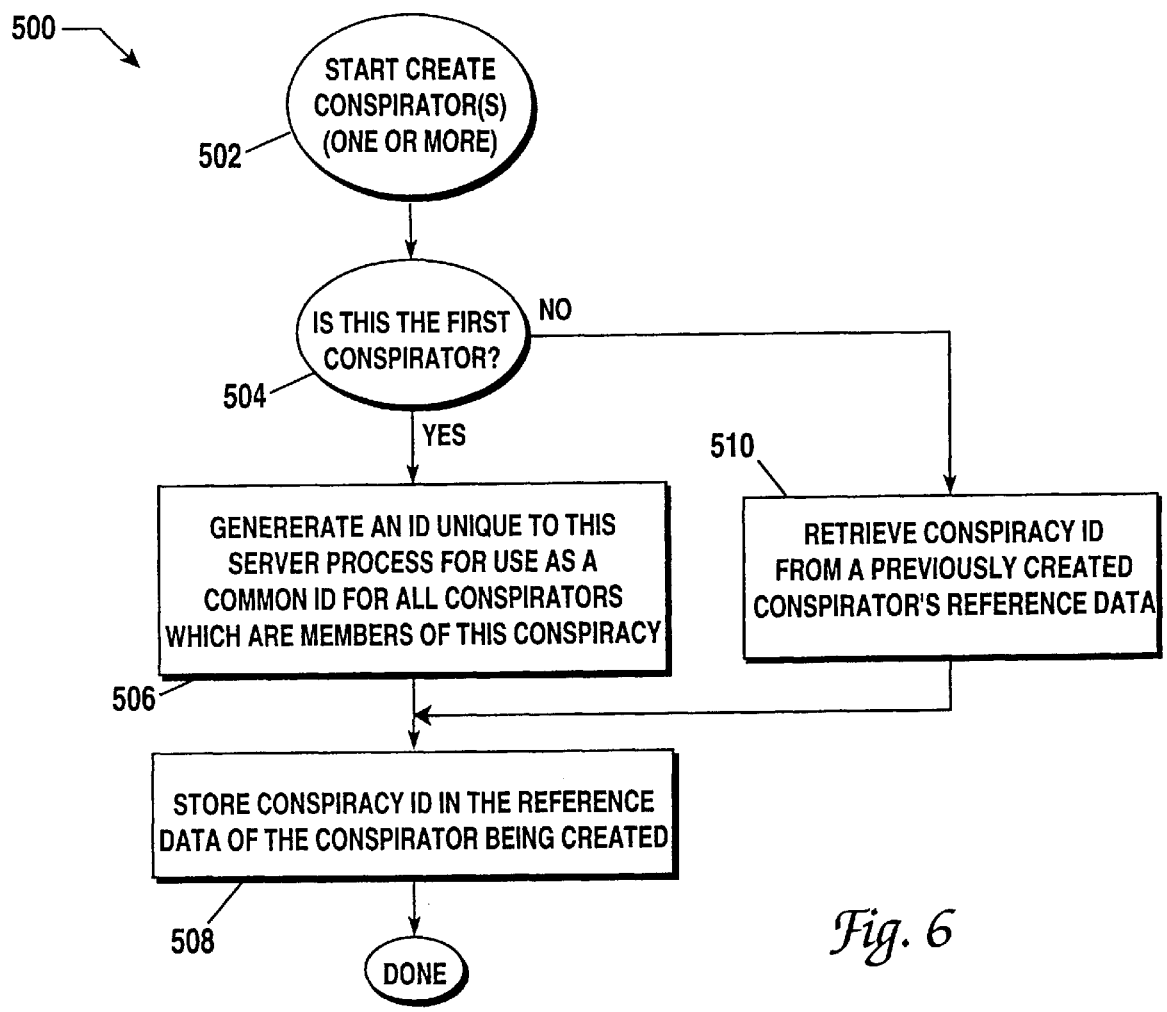
FIG. 6 is a flow chart illustrating a method for creating the conspirators of the shared servant conspiracy model of FIG. 5 in accordance with one aspect of the present invention.

FIG. 6 illustrates one method 500 for creating a shared servant conspiracy 209 in accordance with one aspect of the present invention. In a step 502 the method 500 begins to create the conspirator objects. In some embodiments all the conspirators may be created in conjunction with one another, either sequentially or simultaneously. In other embodiments, the individual conspirator objects could be created based on a criterion such as an as needed basis. In any event, in a next step 504, it is determined if this is the first conspirator object being created for this conspiracy. If the conspirator object is the first conspirator object being created, then in a step 506 a conspiracy identifier unique within the server process 200 is generated. Once the conspiracy identifier is generated it may be used as a common identifier for all conspirator objects which are a member of the conspiracy 209. Since the shared object conspiracy is constrained to one server process 200 which may include more than one conspiracy, the conspiracy identifier must be unique to the server process 200 so that different conspiracies are distinguishable. Subsequent to the conspiracy identifier generating step 506, in a step 508 the conspiracy identifier is stored in persistent memory corresponding to the conspirator object which is being created. By way of example, a distributed object operating environment following the CORBA specification provides reference data (a predefined amount of memory maintained by the ORB, typically up to 1 Kbyte) for each object. Storing the conspiracy identifier in the reference data corresponding to the conspirator object which is being created has been found to work well.

Traveling across the NO branch of step 504, when it is determined that other conspirator objects which are members of the conspiracy 209 have been created, then in a step 510 the conspiracy identifier is retrieved from the reference data of a previously created conspirator object. Once the conspiracy identifier has been retrieved, control is passed to step 508 where the conspiracy identifier is stored in the conspiracy object presently being created.

Figure 7:
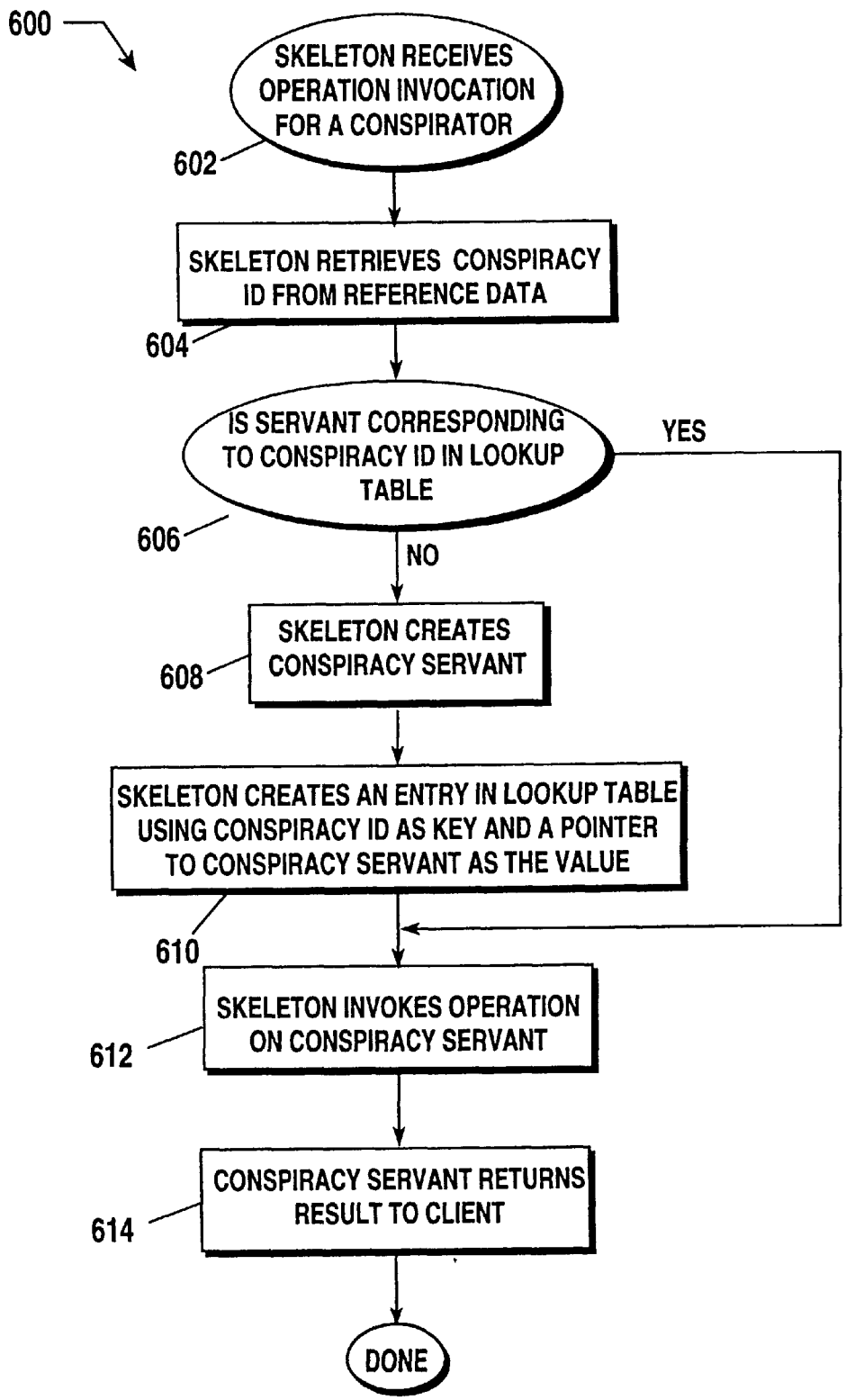
FIG. 7 is a flow chart illustrating a method for invoking and activating the conspirators of the shared servant conspiracy model of FIG. 5 in accordance with one aspect of the present invention.

One method 600 for a shared servant conspiracy 209 to perform requested services in accordance with one aspect of the present invention will be described now with reference to FIG. 7. The method 600 begins in a step 602 when an operation invocation is received by a conspiracy skeleton object. By way of example, the skeleton may receive client requests for service via a surrogate object located on a remote computer system. In a next step 604, the conspiracy identifier is retrieved from the reference data corresponding to the conspiracy object for which the call was received in step 602.

Once the conspiracy identifier is retrieved, using the conspiracy identifier as a key, a step 606 determines if the conspiracy servant is in an active servant lookup table 210. If the conspiracy servant is already listed in the active servant lookup table 210, then the conspirator object or another member of the conspiracy 209 has received an activation call, created the conspiracy servant object 208, and registered the conspiracy in the active servant lookup table 210. However, if the conspiracy servant is not listed in the active servant lookup table 210, these steps must be performed. Thus, in a step 608, a conspiracy servant object 208 is created within the server process 200. This means, in part, that memory for the conspiracy object is allocated within the server process 200.

After the conspiracy servant object 208 is created in step 608, the conspiracy servant object 208 is registered. This includes creating an entry in the active servant lookup table 210 having the conspiracy identifier as the table key and the pointer 206 to the conspiracy servant object as the entry value. Once step 610 is done, the mechanics of performing the requested service can be performed. Accordingly, in a step 612 the skeleton invokes the operation on the conspiracy servant object. The conspiracy servant responds by performing the requested services and, if there are any results, in a step 614 the conspiracy servant will return the results to the client. Note that typically the conspiracy servant does not know the origin of the client request and the ORB manages these communications. Since all the conspirator objects which are members of the conspiracy 209 have a common conspiracy identifier, calls for any of the conspirator objects will be directed to the conspiracy servant object 208.

Next, a shared object model for providing a conspiracy in accordance with one embodiment of the present invention will be described with reference to FIG. 8. In the shared object model, each of the conspirator objects has an object reference which indirects to a conspiracy skeleton. In turn, the conspiracy skeleton has a pointer which directs to a conspiracy servant object. Therefore when a client calls one of the conspirator objects to invoke an object operation, the conspirator skeleton will invoke the operation on the conspirator servant. Subsequently, the conspirator servant, having an object reference to the conspiracy object, will invoke the operation of the conspiracy skeleton. Next the conspiracy skeleton will invoke the operation on the conspiracy servant. Then the conspiracy servant object will perform the requested service and, if necessary, pass any results of the requested operation back out. Note that since each of the conspirator servants has an object reference to the conspiracy servant, the conspiracy may be a distributed conspiracy. That is, the computer service may be comprised of distributed objects located on different computer processes and different computer systems.

Figure 8:
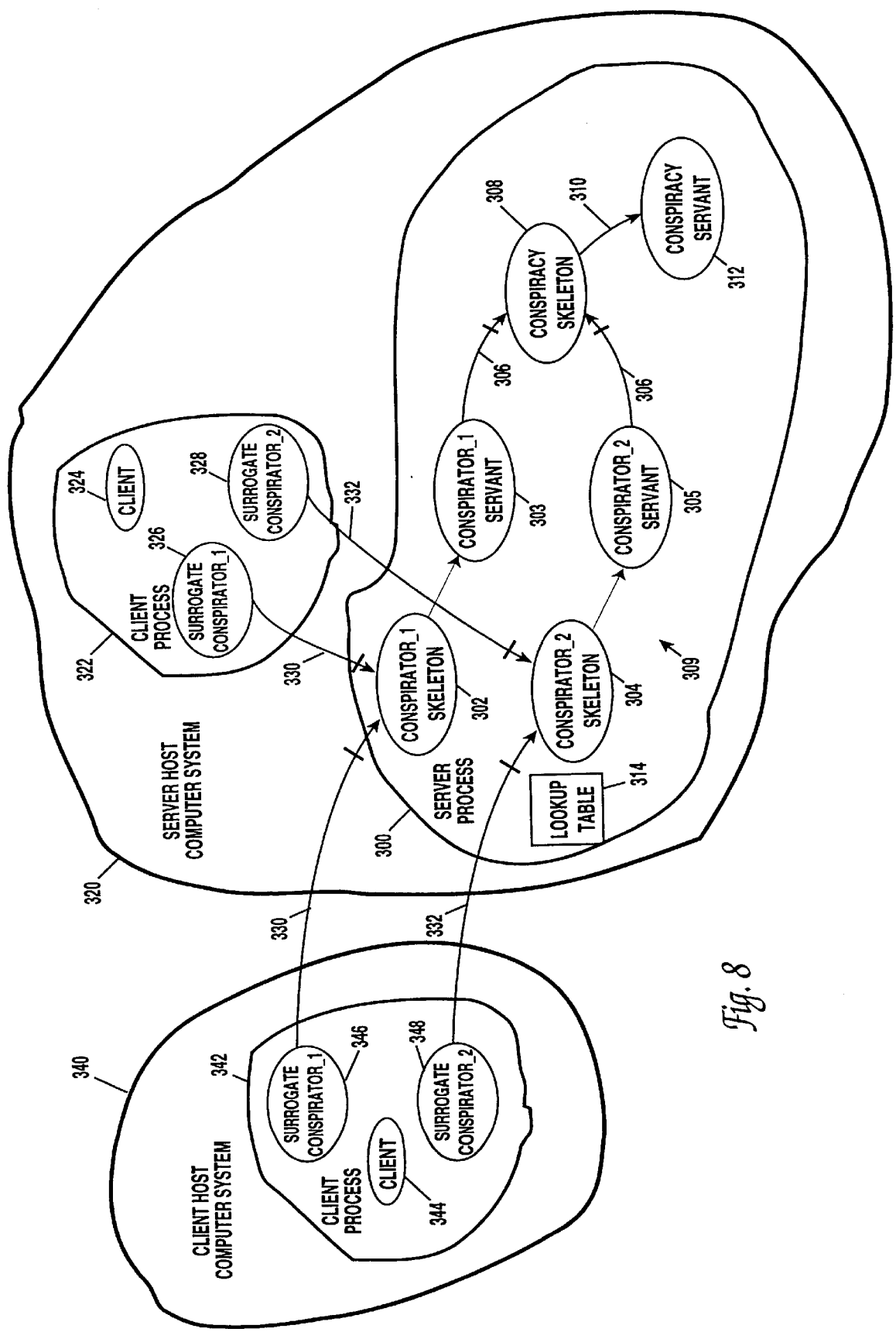
FIG. 8 is a pictorial diagram of a shared object conspiracy model in accordance with another embodiment of the present invention.

FIG. 8 illustrates one sample scenario of the shared object conspiracy in which a server process 300 provides a service to a plurality of clients. The server process 300 includes conspirator objects having skeletons such as conspirator_1 skeleton object 302 and conspirator_2 skeleton object 304 and servants such as conspirator_1 servant object 303 and conspirator_2 servant object 305. The conspirator skeletons find their respective servants by utilizing pointers found in the lookup table 314. Conspirator_1 servant object 303 and conspirator_2 servant object 305 each have a conspiracy object reference 306 indirecting the servant objects to a conspiracy skeleton 308. In turn, the conspiracy skeleton 308 has a pointer 310 directing the conspiracy skeleton 308 to a conspiracy servant object 312. The conspirator_1 servant object 303, the conspirator_2 servant object 305, the conspiracy skeleton 308, and the conspiracy servant object 312 comprise a shared object conspiracy 309.

Also shown in FIG. 8 is a server host computer system 320 (wherein the server process 300 resides) and a remote client host computer system 340. The server host computer system 320 further includes a local client process 322 having a local client 324, a surrogate conspirator_1 object 326 and a surrogate conspirator_2 object 328. In turn, the surrogate conspirator_1 object 326 has a conspirator_1 object reference 330 and the surrogate conspirator_2 object 328 has a conspirator_2 object reference 332. As will be appreciated by those skilled in the art of object oriented programming, a surrogate object resides in a processes potentially separate from the target object host process and acts as a local representation of the target object.

The remote client host computer system 340 includes a remote client process 342 having a remote client 344, a remote surrogate conspirator_1 object 346, and a remote surrogate conspirator_2 object 348. In turn, the remote surrogate conspirator object 346 and the remote surrogate conspirator_2 object 348 have conspirator object references conspirator_1 object reference 330 and conpirator_2 object reference 332, respectively.

Figure 9:
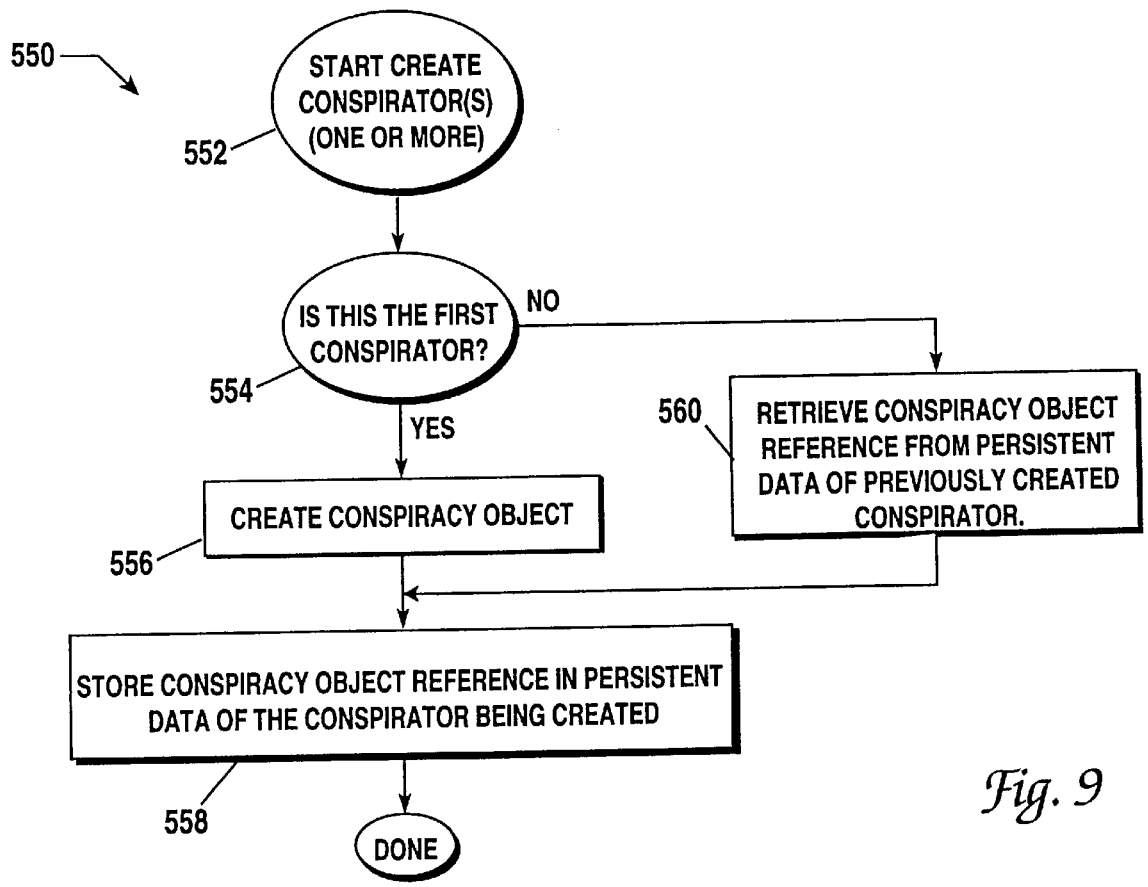
FIG. 9 is a flow chart illustrating a method for creating the conspirators of both the shared object conspiracy model of FIG. 9 and the hybrid conspiracy model of FIG. 13 in accordance with one aspect of the present invention.

A method 550 for creating a shared object conspiracy 309 in accordance with one aspect of the present invention will be described now with reference to FIG. 9. In an initial step 552 the creation method 550 begins. In some embodiments all the conspirators may be created in conjunction with one another, either sequentially or simultaneously. In other embodiments, the individual conspirator objects could be created based on criteria such as an as needed basis. In any case, in a step 554 it is determined if this is the first conspirator object (of this conspiracy) being created. If it is the first conspirator being created, then in a step 556 a conspiracy object is created. Once the conspiracy object is created, in a step 558, the conspiracy object reference 306 is stored in persistent data of the conspirator object being created. By way of example, storing the conspiracy object reference in the reference data of the conspirator object has been found to work well. Turning back to step 554, when it is determined that other conspirator objects have been created, then process control is passed to a step 560 where the conspiracy object reference 306 is retrieved from the persistent data of a previously created conspirator object. Then control is passed to step 558 where the conspiracy object reference 306 is stored in the persistent data of the conspirator object presently being created. Once the conspirator object has the conspiracy object reference 306, the method 550 is complete.

Figure 10:
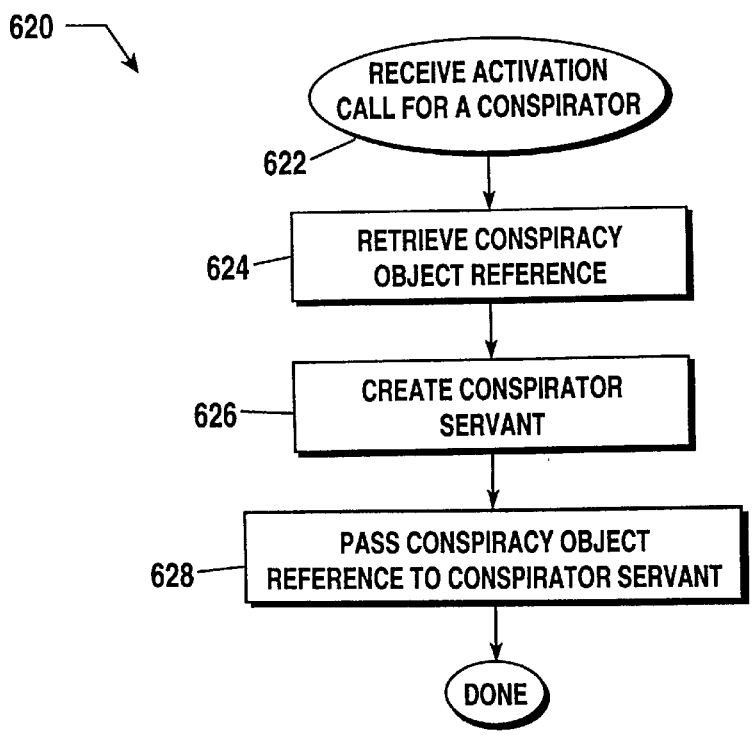
FIG. 10 is a flow chart illustrating a method for activating the conspirators of the shared object conspiracy model of FIG. 9 in accordance with one aspect of the present invention.

A method 620 for activating a conspirator object which is a member of a shared object conspiracy 309 in accordance with one aspect of the present invention will now be described with reference to FIG. 10. In an initial step 622, an activation call for a conspirator object is received. By way of example, the activation call may be generated by the ORB in response to a request for services performed by the shared object conspiracy. If the conspirator object is already active, then the method 620 is complete immediately. However, if the conspirator object is not active, then in step 624 the conspiracy object reference 306 is retrieved from the conspirator object's persistent data. Then, in a step 626, a conspirator servant object is created. Once the conspirator servant object is created, in a step 628 the conspiracy object reference 306 is passed to the conspirator servant object. The conspirator servant object is now active and prepared to receive calls. Note that the order in which the steps of retrieving the conspiracy object reference 306 and creating the conspirator servant object (steps 624 and 626) occur is not critical, and may be reversed or performed simultaneously.

Figure 11:
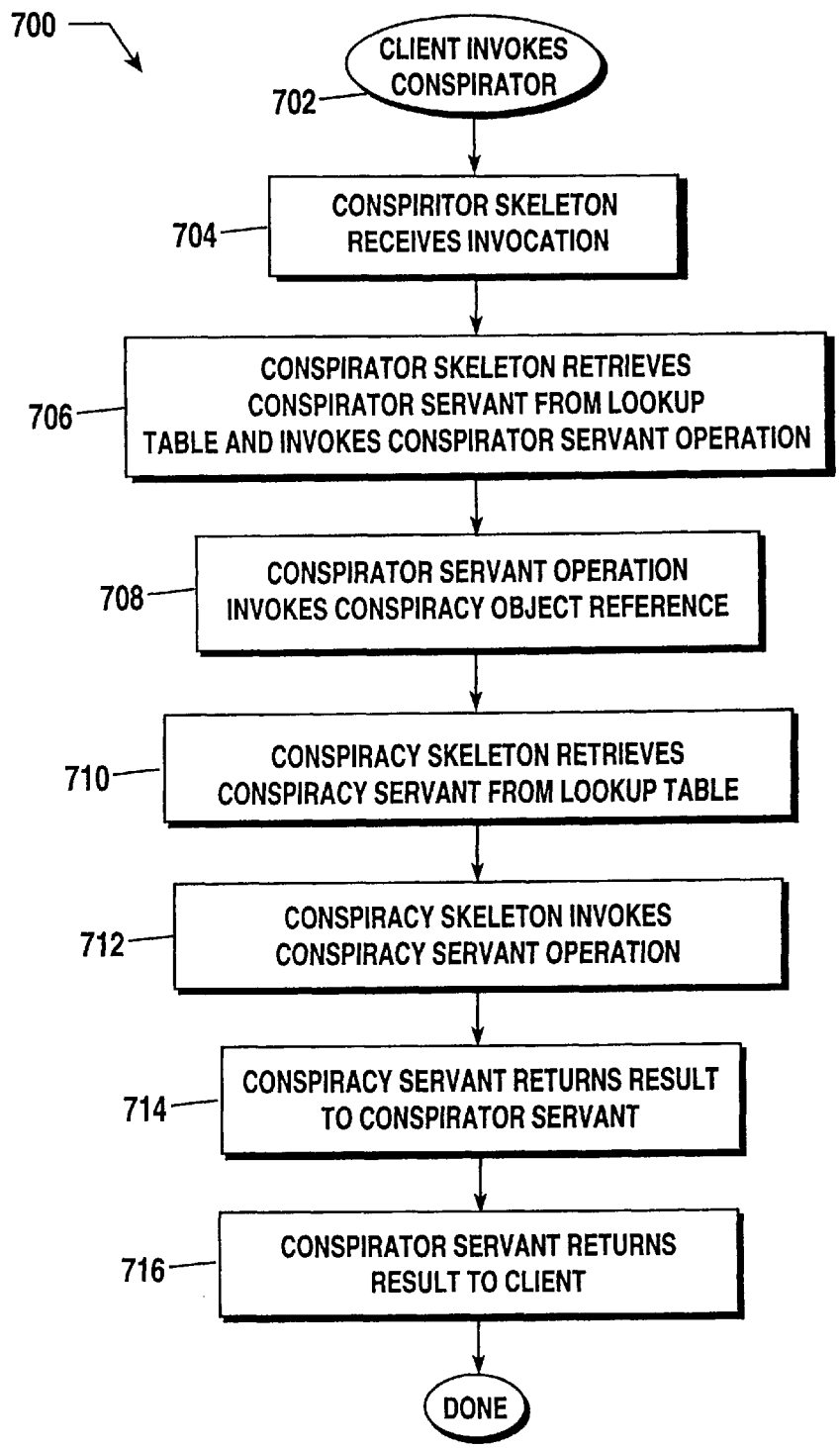
FIG. 11 is a flow chart illustrating a method for the server process of the shared object conspiracy model of FIG. 8 to provide a service to a client in accordance with one aspect of the present invention.

A method 700 for invoking a service of a shared object conspiracy such as shared object conspiracy 309 in accordance with one aspect of the present invention will be described now with reference to FIG. 11. The method 700 initiates in a step 702 when a client invokes an operation of a conspirator object which is a member of the shared object conspiracy 309. In turn, in a step 704, the conspirator skeleton receives the client's request for services. The conspirator skeleton responds, in a step 706, by retrieving the pointer to the conspirator servant object 302 from an active servant lookup table 314 and invoking the operation of the conspirator servant object 302. In some embodiments the active servant lookup table 314 is resident in the server process 300, however, this is optional. Next, in a step 708, the conspirator servant object 302 invokes the operation of the conspiracy skeleton 308 using the conspiracy object reference 306. Note that since in the shared object conspiracy paradigm each of the conspirator object servants have an object reference to the conspiracy skeleton 308, the shared object conspiracy 309 could be a distributed conspiracy with conspirator objects located in separate processes and separate host computer systems. After the conspirator object 308 receives the invocation, the conspirator skeleton, in a step 710, retrieves the pointer 310 to a conspiracy servant object 312 from the active servant lookup table 314. Next, in a step 712, the conspirator skeleton invokes the operation on the conspiracy servant object 312. At this point the conspiracy servant object 312 performs the client requested services.

Once the client services requested originally in step 702 are performed by the conspiracy servant object 312, then, if there are no results which must be returned, the method 700 is complete. However, if there are results to return, the method 700 continues in a step 714 when the conspiracy servant object 312 passes the results directly to the conspirator servant object. In turn, in a step 716, the conspirator servant object returns the results to the client.

Next, a model for providing a hybrid conspiracy in accordance with one embodiment of the present invention will be described with reference to FIG. 12. The hybrid conspiracy model begins similar to the shared object conspiracy model in that each of the conspirator servants has an object reference which indirects to the conspiracy skeleton. In turn, the conspiracy skeleton has a pointer which directs to the conspiracy servant object. However, in some embodiments of the hybrid conspiracy model, the conspiracy servant further has a pointer to a conspiracy engine. In the embodiments wherein the conspiracy includes both a conspiracy servant and a conspiracy engine, upon activation of a conspirator object, the activated conspirator invokes a request for the pointer to the conspiracy engine on the conspiracy object reference. In response, the conspiracy servant passes the pointer to the conspiracy engine back to the conspirator servant. Then, upon receiving client requests, the conspirator servant may pass the service request directly to the conspiracy engine. While the hybrid conspiracy model precludes a distributed conspiracy, it is typically more efficient as calls passed directly using a pointer are generally faster than calls passed indirectly using an object reference.

Figure 12:
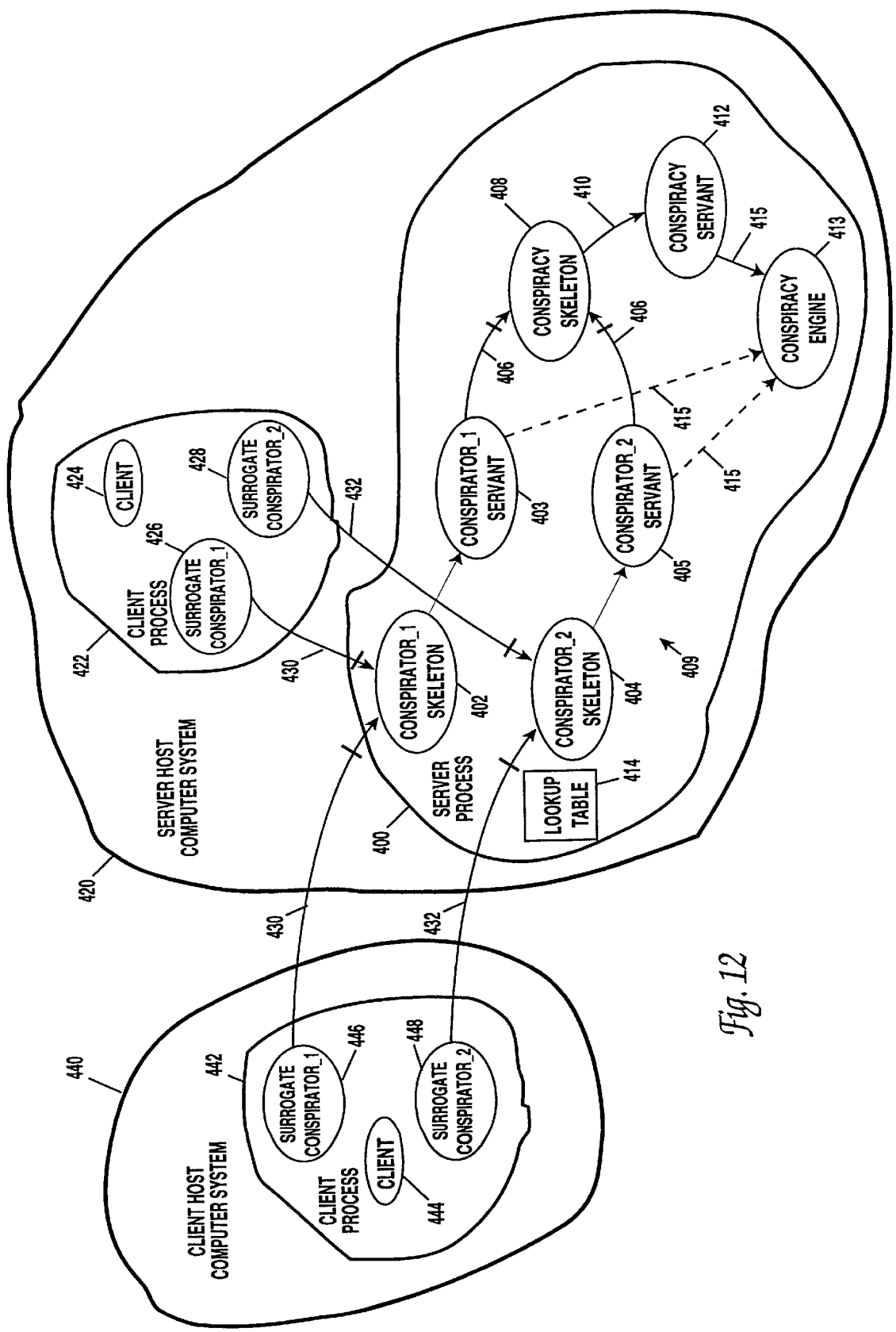
FIG. 12 is a pictorial diagram of a hybrid object conspiracy model in accordance with yet another embodiment of the present invention.

FIG. 12 illustrates one sample scenario of the hybrid conspiracy in which a server process 400 provides service to a plurality of clients. The server process 400 includes conspirator objects having skeletons such as conspirator_1 skeleton object 402 and conspirator_2 skeleton object 404 and servants such as conspirators_1 servant object 403 and conspirator_2 servant object 405. Conspirator_1 servant object 403 and conspirator_2 servant object 405 each have (following creation) a conspiracy object reference 406 indirecting the servant objects to a conspiracy skeleton 408. In turn, the conspiracy skeleton 408 has a pointer 410 directing the conspiracy skeleton 408 to a conspiracy servant object 412. Additionally, the conspiracy servant 412 has a pointer 415 to a conspiracy engine 413. The existence of two conspiracy components—the conspiracy servant 412 and the conspiracy engine 413—is done as an advantageous distribution of operations. Typically the conspiracy servant 412 would have only one operation such as a "return conspiracy engine pointer" operation. In turn, the conspiracy engine 415 would contain all the other operations appropriate for the conspiracy engine and necessary to perform the services of the conspiracy. Upon activation, the conspirator servants will invoke the "return conspiracy engine pointer" operation. As a result of the invocation, the conspirator servants will receive the pointer 415 to the conspiracy engine 413. The conspirator_1 servant object 402, the conspirator_2 servant object 404, the conspiracy skeleton 408, the pointer 410, the conspiracy engine 413, the pointer 415, the conspiracy servant object 412, and any appropriate skeletons or surrogates comprise a hybrid conspiracy 409. In some embodiments, the server process 400 further includes an active servant lookup table 414 as described previously.

Also shown in FIG. 12 is a server host computer system 420 (wherein the server process 400 resides) and a remote client host computer system 440. The server host computer system 420 further includes a local client process 422 having a local client 424, a surrogate conspirator_1 object 426 and a surrogate conspirator_2 object 428. In turn, the surrogate conspirator_1 object 426 has a conspirator_1 object reference 430 and the surrogate conspirator_2 object 428 has a conspirator_2 object reference 432. As will be appreciated by those skilled in the art of object oriented programming, a surrogate object resides in processes separate from the target object host process and acts as local representation of the target object.

The remote client host computer system 440 includes a remote client process 442 having a remote client 444, a remote surrogate conspirator_1 object 446, and a remote surrogate conspirator_2 object 448. In turn, the remote surrogate conspirator object 446 and the remote surrogate conspirator_2 object 448 have conspirator object references conspirator_1 object reference 430 and conspirator_2 object reference 432, respectively.

A suitable creation method for the hybrid conspiracy is the method 550 described above with reference to FIG. 9. This is because the hybrid conspiracy 409 begins out using a conspiracy object reference 406. The hybrid conspiracy 409 and the shared object conspiracy 309 distinguish themselves starting with their respective activation methods.

On method 650 for activating a hybrid conspiracy 409 in accordance with one embodiment of the present invention will be described now with reference to FIG. 13. In an initial step 652, an activation call for one of the conspirator objects is received. By way of example, the activation call may be generated by the ORB in response to a request for services performed by the shared object conspiracy. If the conspirator object is already active, then the activation method 650 is complete immediately. However, if the conspirator object is not active, then in step 654 the conspiracy object reference 406 is retrieved from the conspirator object's persistent data. Then, in a step 656, a conspiracy servant object 402 is created. Then, in a step 656, the conspiracy skeleton 408 is invoked using the conspiracy object reference 406 in order to obtain a pointer 415 to the conspiracy engine 413. Once the conspirator servant object is created and the pointer 415 is retrieved, in a step 660 the pointer 415 is stored in the conspirator servant object. The conspirator servant object is now active and prepared to receive calls.

Figure 14:
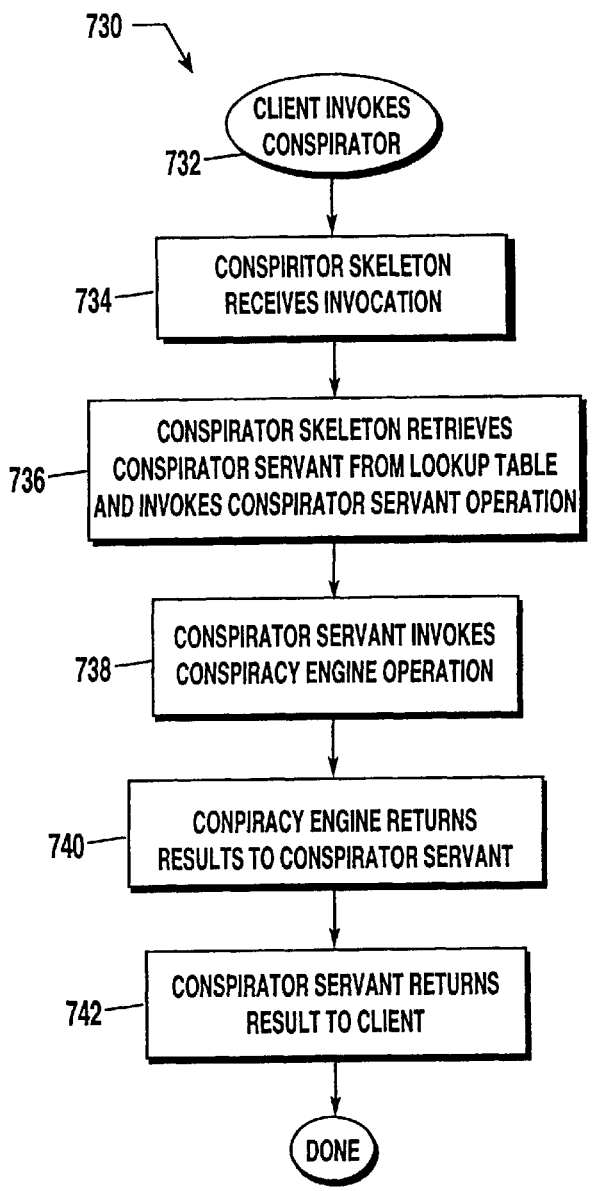
FIG. 14 is a flow chart illustrating a method for the server process of the hybrid conspiracy model of FIG. 12 to provide a service to a client in accordance with one aspect of the present invention.

A method 730 for invoking a service of a hybrid conspiracy such as hybrid conspiracy 409 in accordance with one aspect of the present invention will be described now with reference to FIG. 14. The method 730 initiates in a step 732 when a client invokes an operation of a conspirator object which is a member of the hybrid conspiracy 409. In turn, in a step 734, the conspirator skeleton receives the client's request for services. The conspirator skeleton responds, in a step 736, by retrieving the pointer to the conspirator servant object from an active servant lookup table 414 and invoking the operation of the conspirator servant object. In some embodiments the active servant lookup table 414 is resident in the server process 400, however, this is optional. Next, in a step 738, the conspirator servant object invokes the operation of the conspiracy engine 413 directly using the pointer 415 which it received during activation. Note that since, in the hybrid conspiracy paradigm, the conspirator servant objects utilize a pointer to the conspiracy engine 413, this model can not be distributed. After receiving the invocation, the conspiracy engine 413 performs the client requested services.

Once the client services requested originally in step 732 are performed by the conspiracy engine 415, then, if there are no results which must be returned, the method 730 is complete. However, if there are results to return, the method 730 continues in a step 740 when the conspiracy engine 414 passes the results directly to the conspirator servant object. In turn, in a step 742, the conspirator servant object returns the results to the client.

Although only a few embodiments of the present invention have been described, it should be understood that the present invention may be embodied in many other specific forms without departing from the spirit or scope of the invention. For instance, the conspiracy samples described with reference to FIGS. 5, 8, and 12 are simply representative examples and are not to be construed as limiting. For example, the service represented by the server process may include a number of objects; two objects were chosen for the example as at least two conspirator objects were necessary to describe all the characteristics of a conspiracy. As another example, the server process may contain other objects not involved in a conspiracy, other conspiracies, and other computer entities. Additionally, the server host computer system and the client host computer system may contain other computer processes. In short, as should be appreciated, there are multiple configurations that the computer environment may assume in which the present invention may be implemented.

As will be appreciated by those skilled in the art of object oriented programming, the boundaries utilized to distinguish many of the computer entities such as surrogates, skeletons, servant objects and server processes are somewhat arbitrary and are provided as drawn to aid illustration of the conspiracy paradigms. However, when implemented on a computer system, these boundaries are not necessarily as clear as the FIGS. may imply to those not fully conversant in the field of object oriented programming.

Figure 13:
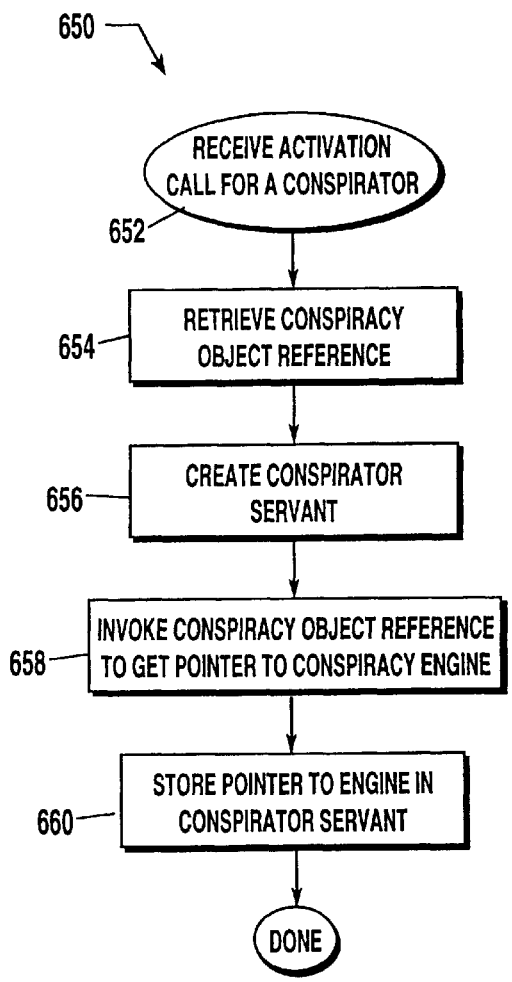
FIG. 13 is a flow chart illustrating a method for activating the conspirators of the hybrid conspiracy model of FIG. 12 in accordance with one aspect of the present invention.

Still further, the described embodiment of the hybrid conspiracy model of FIG. 13 could be modified so that the conspiracy servant 412 and the conspiracy engine 413 are one servant/engine. Then a single pointer indirecting to the conspiracy servant/engine could be passed to the conspirator servant(s) and the conspiracy servant/engine would perform all appropriate operations including the "return conspiracy engine pointer" operation.

Therefore, the present examples are to be considered as illustrative and not restrictive, and the invention is not to be limited to the details given herein, but may be modified within the scope of the appended claims.

We claim:

1. A computer implemented service arranged to reside within a server process executed on a computer that is arranged to be a part of a distributed object environment based computing system, the service comprising:
   a conspiracy servant;
   a plurality of conspirator objects, each conspirator object having an associated object reference and an associated skeleton, the conspirator objects being arranged to process collectively requests received from clients, the skeletons each being arranged to pass incoming client requests to the conspiracy servant; and
   wherein the conspiracy servant is a arranged to provide the requested services that are requested of each of the conspirator objects and wherein the collective processing of the requests by the conspirator objects includes communication among the conspirator objects independent of the interfaces presented to the clients by the conspirator objects.

2. A computer implemented service as recited in claim 1 further comprising a servant lookup table that is accessible to the skeletons and is intended to reside in the process and identifies the location of all servants available for use in the process, including the conspiracy servant.

3. A computer implemented service as recited in claim 1 wherein the distributed objects each have a distinct interface.

4. A computer implemented service as recited in claim 1 wherein the conspiracy servant is arranged to return results directly to the client.

5. A computer implemented service as recited in claim 1 wherein the skeletons are arranged to unmarshal client requests received from remote clients.

6. A computer implemented service arranged to be a part of a distributed object environment based computing system, the service comprising:
   a conspiracy object including a conspiracy skeleton and a conspiracy servant, the conspiracy object further being configured to communicate with associated conspirator objects independent of the interface presented by the conspiracy object to external clients of the conspiracy object; and
   a plurality of distributed conspirator objects, each distributed conspirator object having an associated conspirator object reference, an associated conspirator skeleton that is arranged to receive requests from clients, and an associated conspirator servant, the conspirator skeleton being arranged to pass incoming client requests directly to the conspirator servant, the conspirator servant knowing the object reference associated with the conspiracy object so that the conspiracy skeleton can make requests to the conspiracy servant;
   wherein the conspiracy object is arranged to provide the requested services that are requested of each of the conspirator objects by collective processing of such requested services in conjunction with the associated conspirator objects.

7. A computer implemented service as recited in claim 6 further comprising a servant lookup table that is available to the skeletons and identifies the location of various servants, including the conspiracy servant.

8. A computer implemented service as recited in claim 6 wherein the conspirator objects each have a distinct interface.

9. A computer implemented service as recited in claim 6 wherein the conspiracy servant is arranged to return results to the conspirator servants and the conspirator servants are arranged to return results to the client.

10. A computer implemented service as recited in claim 9 wherein the conspirator servants are arranged to partially process the client request.

11. A computer implemented service arranged to reside within a server process executed on a computer that is arranged to be a part of a distributed object environment based computing system, the service comprising:
    a conspiracy object including a conspiracy skeleton, a conspiracy servant, and a conspiracy engine, the conspiracy object further having an associated conspiracy object reference that permits access to the conspiracy skeleton and that is not accessible to external clients of the conspiracy object; and
    a plurality of distributed conspirator objects, each distributed conspirator object having an associated conspirator skeleton that is arranged to receive requests from clients, an associated conspirator object reference that permits access to the conspiracy skeleton and may be known by external clients, and an associated conspirator servant, the conspirator skeleton being arranged pass incoming client requests directly to the conspiracy servant, the conspiracy servant knowing the object reference associated with the conspiracy object so that the conspirator servant can make requests to the conspiracy object; and
    wherein the conspiracy servant is arranged to return a direct pointer to the conspiracy engine to the conspirator servants when a request is made to the conspiracy object such that the conspirator servants can communicate directly with the conspiracy engine to process thereby services requested of the conspiracy object from a client collectively without using elements of the interface of the conspiracy object that are accessible to the client.

12. A computer implemented service as recited in claim 11 further comprising a servant lookup table that is available to the skeletons and identifies the location of various servants, including the conspiracy servant.

13. A computer implemented service as recited in claim 11 wherein the conspirator objects each have a distinct interface.

14. A computer implemented service as recited in claim 11 wherein the conspiracy engine is arranged to return results to the conspirator servants and the conspirator servants are arranged to return results to the client.

15. A computer implemented service as recited in claim 14 wherein the conspirator servants are arranged to partially process the client request.

16. A computer implemented method for providing a service to clients, the service being implemented within a server process, the method comprising the computer controlled steps of:

providing a conspiracy servant and a plurality of associated conspirator objects, each conspirator object including a corresponding conspirator skeleton and each conspirator object being configured to function in association with at least one other conspirator object without using the interface of the other conspirator object that is accessible to the clients;

receiving at a first conspirator skeleton a first invocation request for a first conspirator object associated with the first conspirator skeleton;

causing the first conspirator skeleton to directly invoke the conspiracy servant;

returning a result directly from the conspiracy servant to a client that initiated the first conspirator invocation request;

receiving at a second conspirator skeleton a second invocation request for a second conspirator object associated with the second conspirator skeleton, the first and second conspirator skeletons being distinct from one another;

causing the second conspirator skeleton to directly invoke the conspiracy servant; and returning a result directly from the conspiracy servant to a client that initiated the second conspirator invocation request.

17. A method as recited in claim 16 wherein each time one of the conspirator skeletons invokes the conspiracy servant, the invoking skeleton checks an active servant lookup table to determine whether the conspiracy servant is identified as active in the lookup table, and when it is determined that the conspiracy servant is not identified as active in the lookup table the invoking skeleton creates the conspiracy servant and identifies the conspiracy servant as active in the lookup table.

18. A method as recited in claim 17 wherein when the conspiracy servant is created, a conspiracy ID is used as a key in the lookup table and a pointer to the conspiracy servant is stored as a value that corresponds to the key.

19. A method as recited in claim 18 wherein when the conspiracy servant is identified as active in the lookup table, the invoking skeleton identifies the conspiracy servant using the conspiracy ID and utilizes the stored value that corresponds to the conspiracy ID to locate the conspiracy servant.

20. A method as recited in claim 16 wherein each of the conspirator skeletons share a single conspiracy ID that operates as the skeleton's servant ID.

21. A computer implemented method for providing a service to clients, the method comprising the computer implemented steps of:

providing a conspiracy servant and a plurality of associated conspirator objects, each conspirator object including a corresponding conspirator skeleton and each conspirator object being configured to function in association with at least one other conspirator object without using the interface of the other conspirator object that is accessible to the clients;

receiving at a first conspirator skeleton a first invocation request for a first conspirator object associated with the first conspirator skeleton;

causing the first conspirator skeleton to directly invoke the conspiracy servant;

causing the first conspiracy servant to invoke a conspiracy object reference associated with the conspiracy object, the conspiracy object reference not available to clients that are not part of the service;

returning a result from the conspiracy servant to a client that initiated the first conspirator invocation request;

receiving at a second conspirator skeleton a second invocation request for a second conspirator object associated with the second conspirator skeleton;

causing the second conspirator skeleton to invoke the conspiracy servant;

causing the second conspiracy servant to invoke a conspiracy object reference associated with the conspiracy object, the conspiracy object reference not available to clients that are not part of the service;

returning a result from the conspiracy servant to a client that initiated the second conspirator invocation request; and returning results from the conspiracy servants to their respective clients.

22. A computer implemented service arranged to reside within a server process executed on a computer that is arranged to be a part of a distributed object environment based computing system, the service comprising:

a plurality of conspirator objects, each conspirator object having an associated object reference and an associated skeleton that is arranged to receive requests from clients that reside outside of the service process, the skeletons each being arranged to pass incoming client requests directly to the conspiracy servant, each conspirator object having an object interface that defines services the conspirator object can provide to clients, the services the conspirator object can provide being a subset of the plurality of computer services performed by the conspiracy servant, the plurality of services including services available only to other conspirator objects and not accessible through the interface of the conspirator object by the clients of the conspirator object; and wherein the conspiracy servant is arranged to provide the requested services that are requested of each of the conspirator objects.

* * * * *

UNITED STATES PATENT AND TRADEMARK OFFICE
CERTIFICATE OF CORRECTION

PATENT NO. : 5,969,967
DATED : October 19, 1999
INVENTOR(S) : Aahlad et al.

It is certified that error appears in the above-identified patent and that said Letters Patent is hereby corrected as shown below:

Column 17,
Line 29, "servant is a arranged" should be changed to --servant is arranged--.

Column 18,
Line 36, insert --to-- before "pass".

Column 20,
Line 36, "service" should be changed to --server--.

Signed and Sealed this

Seventh Day of August, 2001

*Attest:*

*Attesting Officer*

NICHOLAS P. GODICI
*Acting Director of the United States Patent and Trademark Office*